Nov. 24, 1964 A. W. SCRIBNER 3,158,263
EXTRUSION PRESS
Original Filed Oct. 18, 1960
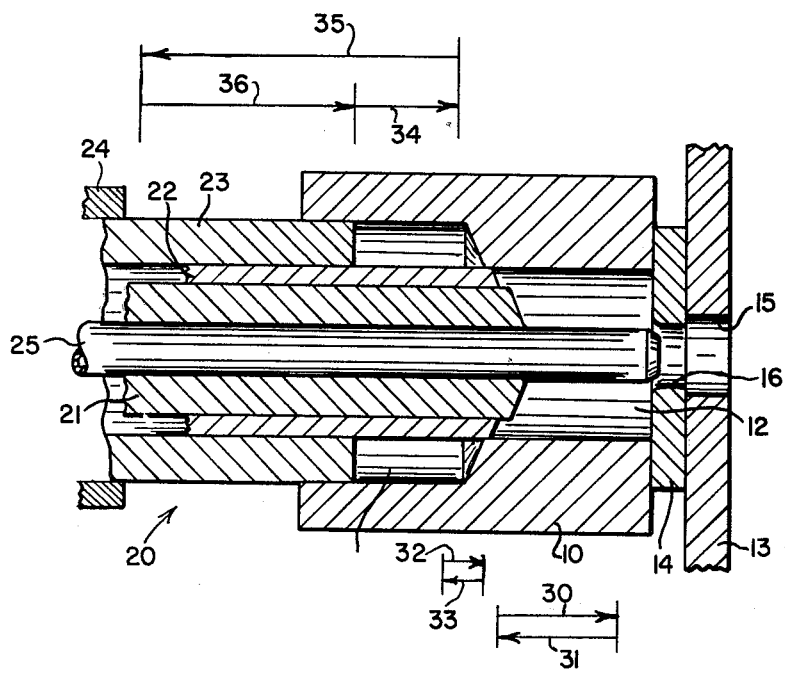
Albert W. Scribner

3,158,263
EXTRUSION PRESS
Albert W. Scribner, 6 Country Club Road, Darien, Conn.
Original application Oct. 18, 1960, Ser. No. 63,360, now Patent No. 3,107,787, dated Oct. 22, 1963. Divided and this application Sept. 9, 1963, Ser. No. 307,700
1 Claim. (Cl. 207—9)

This invention relates to a novel extrusion press for metals and the like. More particularly the invention relates to an improved ram arrangement for presses that are adapted to continuously extrude a work material.

In U.S. Patent 2,964,177, issued December 13, 1960, several presses are illustrated for continuously extruding metal. In these presses the rams are located either at opposite ends of the container or on different sides thereof and these arrangements necessitate a relatively complex frame structure for the press and also require a relatively wide physical separation between the various hydraulic motors and related equipment that actuate the various dispersed press rams.

The principal object of the present invention is to provide a continuous extrusion press having an improved compact and efficient disposition for the three press rams whereby a greatly simplified press frame and motor arrangement becomes possible.

Another object of the invention is to provide a continuous extrusion press having an extrusion ram that is substantially smaller in cross section than the extrusion chamber whereby smaller extrusion forces are required to die express a given product.

Other objects of the invention will become apparent as the disclosure progresses.

In the drawings:

FIG. 1 is an axial sectional view of an extrusion press arrangement showing the instant improved ram disposition in relation to the press container.

Referring to FIG. 1 the instant press arrangement comprises a container 10 that is formed with two coaxial cylindrical chambers 11 and 12 which dispose in coextensive end to end relation. Operatively mounted on the machine frame and disposed adjacent the right end of said container is a movable cross head 13 that operatively supports a die unit 14 against the right end of container 10. The cross head 13 is formed with a central aperture 15 so as to accommodate the flow of work material through the orifice 16 formed in the die unit 14.

Ram means 20 are provided at the left end of container 10 for feeding work metal from the feed chamber 11 to the extrusion chamber 12 and for continuously die expressing work material from extrusion chamber 12 through the die orifice 16; said rams means comprising three telescopically mounted rams 21, 22 and 23. The extrusion ram 21 is cross sectionally much smaller in area than the extrusion chamber 12 while the tubular valving ram 22 is axially movable into and out of sliding engagement with the walls defining the left end of extrusion chamber 12. The tubular feed ram 23 is telescopically mounted on the valving ram 22 and is slidable into and out of engagement with walls defining the chamber 11. The rams 21–23 are suitably supported by the machine frame 24 for axial reciprocatory movement and are power actuated in mutual timed relation by means of hydraulic motors or the like so as to effect the desired sequential strokes of said rams. A tubular mandrel 25 is slidably supported by extrusion ram 21 and has an inner end that is operatively disposed in the die opening 16. When using a tubular mandrel 25 the press is adapted to carry out a continuous cable sheathing operation. The ram 21 is adapted to move through forward and reverse strokes 30 and 31, while ram 22 is adapted to move through forward and reverse strokes 32 and 33. Ram 23 is adapted to move through a forward working stroke 34, retractive stroke 35 and a feed stroke 36.

In operation the rams 21–23 and mandrel 25 are withdrawn and a tubular cylindrical billet is inserted into chamber 12. Ram 21, mandrel 25 and a ram 22 are then advanced to their FIG. 1 positions. Two complemental semi-annular cross sectioned billet halves forming a composite tubular work billet are then placed over the outer surfaces of ram 22 and are displaced into the annular work receiving portion of chamber 11 and held in static compressed condition by the feed ram 23. The timing sequence of the subsequent movement of the rams 21–23 is such that a continuous extrusion force is applied to the work metal in the extrusion chamber 12. When the container is charged with work billets as above described and the rams are respectively advanced to their FIG. 1 positions, the extrusion ram 21 is advanced thereby forcing some of the work metal in chamber 12 through the die orifice 16. Just before the end of the advancing movement of ram 21 the valving ram 22 is retracted thereby communicating chambers 11 and 12 whereupon ram 23 is advanced whereafter ram 21 may be gradually retracted. During this action the advancing movement of ram 23 is such as to refill chamber 12 while simultaneously maintaining an extrusion flow through die opening 16. Near the end of the advance of ram 23 the now retracted ram 21 commences a second advancing extrusion movement and the valving ram 22 is advanced to isolate chambers 11 and 12 just after the end of the advance of ram 23. Ram 23 is then fully retracted and another two piece annular billet charged into chamber 11 while ram 21 continues its forward extrusion stroke. This sequence of ram actuation is repeated so that although the charging of the press is intermittent the extruding of the work metal is continuous. It will be understood that the cable to be sheathed is continuously conducted through mandrel 25 during the operation of the press. The respective speeds of the ram motions are correlated so that the continuous flow of work metal through the orifice 16 occurs at a substantially uniform mass rate corresponding to the speed of the cable feed movement.

The mandrel 25 may be solid, or even eliminated and ram 21 made solid, where continuous extrusion operations other than cable sheathing are desired. When mandrel 25 is eliminated the die unit 14 instead of being mounted at the end or side of chamber 12 may be operatively mounted on the inner end of the tubular ram 21 and the right end of chamber 12 then blocked so that an indirect extrusion action may be obtained.

Where powdered rather than solid metal is being worked a powdered charge is placed in the chamber 11 and is initially cold packed or pressure sintered therein by the advancing action of ram 23. Ram 23 is held so as to retain the charge in this compressed condition as in the previous case until the latter subsequently receives an extrusion force as applied by the rams 21 and/or 23. Once the powdered charge is compressed by ram 23 in the isolated chamber 11 the packing and/or extrusion working forces thereon are not relieved until the material progressively passes through the die orifice 16. The degree of initial compression of the charge in chamber 11 may be optimized to complement the serial die expressing action of the work material flow first from chamber 11 to chamber 12 and then from chamber 12 through orifice 16.

This application is a division of my previously co-pending application Serial No. 63,360, filed October 18, 1960, now Patent No. 3,107,787, issued October 22, 1963.

While only one embodiment of the invention has been shown and described, it will be apparent to those skilled in the art that numerous variations and modifications may be made in the particular construction without departing from the underlying principles of the invention. It is therefore desired, by the following claim, to include within the scope of the invention all such variations and modifications whereby substantially the results of the invention may be obtained by the use of substantially the same or equivalent means.

I claim:

In an extrusion press:

A container;

said container having an extrusion chamber and a feed chamber formed in said container in coextensive end to end relation;

an extrusion die operatively mounted in the walls defining said extrusion chamber;

a group of three telescopically arranged rams disposed at one end of said container, said group including an extrusion ram slidably mounted at one end of said extrusion chamber, said extrusion ram having a cross sectional area substantiallly less than that of said extrusion chamber;

a valving ram telescopically mounted on said extrusion ram and having an outer cylindrical surface that is adapted to move into and out of sliding engagement with the walls defining said end of said extrusion chamber; and a feed ram telescopically mounted on said valving ram and having an outer cylindrical surface that is adapted to move into and out of sliding engagement with the walls defining the said feed chamber;

said three telescopically arranged rams being adapted to be power actuated in timed relation so as to apply a continuous extrusion force to work material in said extrusion chamber.

References Cited by the Examiner
UNITED STATES PATENTS 2,706,308  4/55  Lorenz _____ 18—513
2,964,177  12/60  Scribner _____ 207—2

MICHAEL V. BRINDISI, *Primary Examiner.*